Nov. 11, 1952     V. F. MICHAEL     2,617,757
AZEOTROPIC DISTILLATION OF KETONE-CONTAINING ALCOHOLS
Filed Aug. 2, 1947
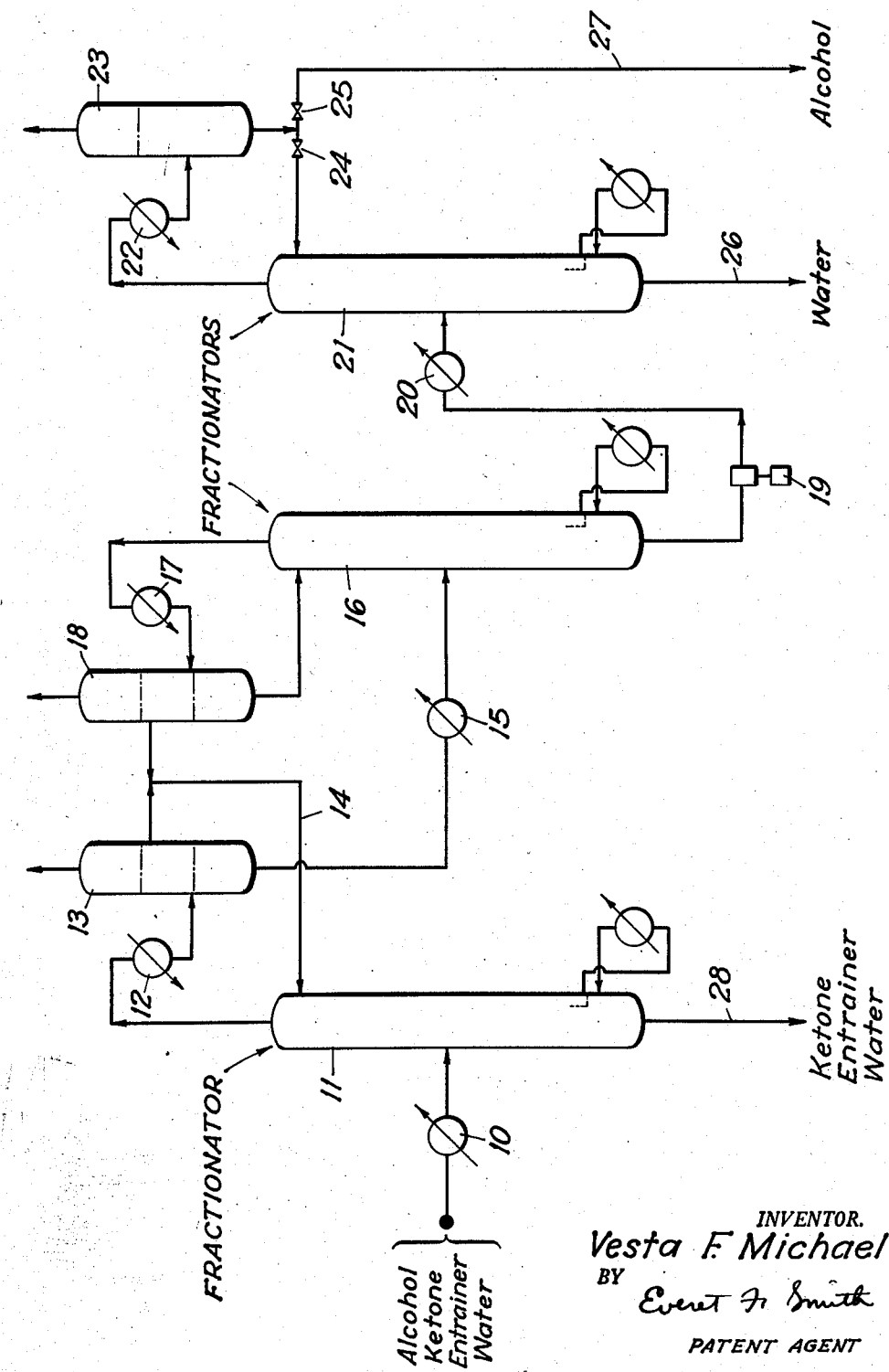
INVENTOR.
*Vesta F. Michael*
BY
*Everet F. Smith*
PATENT AGENT Patented Nov. 11, 1952

2,617,757

UNITED STATES PATENT OFFICE 2,617,757

AZEOTROPIC DISTILLATION OF KETONE-CONTAINING ALCOHOLS

Vesta F. Michael, Tulsa, Okla., assignor to Stanolind Oil and Gas Company, Tulsa, Okla., a corporation of Delaware Application August 2, 1947, Serial No. 765,741

9 Claims. (Cl. 202—42)

This invention relates to the purification of alcohols, and more particularly to a method for the preparation of substantially pure alcohols from mixtures thereof with methyl propyl ketone.

My invention broadly comprises a process for separating ethanol or n-propyl alcohol from mixtures thereof with methyl propyl ketone by fractional distillation with a hydrocarbon liquid having suitable characteristics as hereinafter defined. By this means, I am able to withdraw an overhead fraction containing substantially none of the methyl propyl ketone, and I may thereafter separate a substantially pure alcohol product from said overhead fraction by suitable means.

Numerous methods have been devised in the prior art for producing alcohols from various raw materials. For example, in the so-called Fischer-Tropsch process, wherein carbon monoxide is hydrogenated over a suitable catalyst, the principal product is a mixture of hydrocarbons; but a substantial quantity of oxygenated compounds, including alcohols, ketones, aldehydes, carboxylic acids, and phenolic compounds, are also produced, particularly when the reaction is carried out in the presence of an iron catalyst containing an alkaline promoter. Higher proportions of alcohols are produced by the so-called "Synol" process, which is a modified Fischer-Tropsch process, operated at higher pressure and lower temperature, for example, around 18-25 atmospheres and 375-400° F. Mixed oxygenated compounds have also been produced by numerous processes in which hydrocarbons are subjected to an oxidation treatment.

In all of the various processes for producing oxygenated substances, the isolation of individual compounds is a difficult problem, owing to the large number of components in the product mixtures, and owing to the comparatively small differences in chemical and physical properties among the constituent compounds. In particular, the isolation of alcohols, aldehydes, and ketones is difficult, because of their great reactivity and their tendency to form azeotropic mixtures on distillation.

When efforts are made to separate ethanol and n-propyl alcohol from mixtures containing methyl proyl ketone by fractional distillation, for example, of the crude products produced in one of the processes noted above, the resulting alcohol fractions ordinarily contain up to around 5% or more by volume of the ketone, depending on the concentration of ketone in the starting material and on the efficiency of the fractionating means. The concentration of contaminating ketone can be reduced to as low as around 1% by volume by employing fractionating equipment of high efficiency and by operation at high reflux ratios, but cannot be reduced substantially below this figure by ordinary methods, owing to the existence of azeotropic mixtures. In this situation, I have discovered that ethanol and n-propyl alcohol can be separated substantially completely from the undesired ketone by fractional distillation in the presence of a suitable entrainer liquid, the alcohol or alcohols being taken off overhead as azeotropic mixtures with the entrainer liquid, substantially free from the ketone. The alcohol or alcohols may subsequently be recovered from the distillate in any desired degree of purity, by well-known means, such as by extractive distillation, by azeotropic distillation with water, or by extraction with a suitable solvent, followed by fractional distillation.

In a preferred form of my invention, I subject a mixture of ethanol and/or n-propyl alcohol containing methyl propyl ketone to fractional distillation in the presence of water and a suitable entrainer liquid. A heterogeneous stream, containing the alcohol, water, and entrainer liquid, with substantially none of the undesired ketone, is taken off overhead and separated into phases. The aqueous phase, containing most of the alcohol and a minor proportion of entrainer liquid, is withdrawn for further processing to isolate the alcohol; and the entrainer-liquid phase is recycled to the fractionating column. A mixture of entrainer liquid, ketone, and any residual water is ultimately withdrawn from the bottom of the fractionating column.

Entrainer liquids for use in my process should form a binary constant-boiling mixture with the alcohol that is to be purified, and a ternary constant-boiling mixture, preferably heterogeneous, with water and alcohol. Moreover, the aqueous phase of the heterogeneous ternary constant-boiling mixture should preferably contain a substantial proportion of the alcohol distilled overhead, in order to minimize the heat utilization per unit of product. The entrainer liquid preferably should not form a constant-boiling mixture with the ketone impurity; but if it does form such a constant-boiling mixture, the boiling point thereof should be sufficiently far above the boiling points of the binary entrainer-alcohol constant-boiling mixture and of the ternary entrainer-alcohol-water constant-boiling mixture to permit their separation by fractional distillation. In general, hydrocarbon liquids which are stable and unreactive under the conditions employed in the fractionation, and which boil within the range of about 50 to 150° C. are suitable as entrainer liquids for use in my process. Among such liquids are aliphatic hydrocarbons, such as hexanes, hexenes, heptanes, heptenes, octanes, octenes, nonanes, nonenes, and mixtures thereof, such as petroleum naphthas; cycloaliphatic hydrocarbons, such as cyclopentane, methylcyclopentane, cyclohexane, methylcyclohexane and the like; and aromatic hydrocarbons, such as benzene, toluene, and xylene.

In carrying out my process, I prefer first to separate a comparatively narrow-boiling fraction of ketone-contaminated ethanol and/or n-propyl alcohol. I then introduce this fraction, together with entrainer liquid and optionally with water, into a suitable fractionating still, and subsequently carry out the distillation as described above. I prefer to operate at ordinary pressures, but somewhat elevated and reduced pressures are also operative. I may introduce additional entrainer liquid from time to time to make up for losses from the still, and I may add water or steam, either continuously or intermittently, in order to maintain a desired proportion of water in the still system during the distillation. My process may be carried out satisfactorily in either batch-type or continuous equipment.

The aqueous ketone-free alcohol solution that is withdrawn overhead from the heterogeneous constant-boiling mixture obtained in the preferred form of my invention may subsequently be subjected to a second distillation to separate a ternary heterogeneous azeotrope containing entrainer, water, and alcohol, of which the aqueous phase may be refluxed, and the entrainer phase may be returned to the first distillation step. The bottoms from the second distillation step, now free of both entrainer and ketone, may be subjected to further processing steps, well known in the art, to recover alcohol of any desired purity.

My invention may be more fully understood from the following examples:

Example I

The aqueous phase from a Fischer-Tropsch process, employing an alkali-promoted iron catalyst, was carefully fractionated, and a fraction was isolated boiling between 77 and 78° C. and having the following properties:

| | Per cent by weight |
|---|---|
| Ethanol | 93.44 |
| Methyl propyl ketone | 1.50 |
| Water | 4.75 |
| Ester, as ethyl propionate | 0.31 |
| Acidity, as acetic acid | 0.003 |
| Specific gravity, $D_4^{20}$ °C. | 0.7996 |
| Refractive index, $n_D^{20}$ | 1.36308 |

A mixture containing 200 parts by volume of the 77–78° C. fraction, 150 parts by volume of heptane, and additional water was fractionated in a batch still, and a heterogeneous ternary constant-boiling mixture boiling at 68.2° C. and having the following composition was taken off overhead:

| | Per cent by volume |
|---|---|
| Heptane | 63.50 |
| Ethanol | 30.35 |
| Water | 6.15 |
| Ratio (in distillate) of organic to aqueous phase: | 1.69 |

The ethanol recovered from the aqueous phase of the constant-boiling mixture gave no precipitate with 2,4-dinitrophenylhydrazine, and was therefore substantially free from methyl propyl ketone.

Example II

A Fischer-Tropsch ethanol fraction boiling between 77 and 79° C. was found to contain the following impurities:

| | Per cent by volume |
|---|---|
| Methyl propyl ketone | 1.09 |
| Water | 4.48 |

A mixture of 767 parts by volume of the 77–79° C. fraction and 460 parts by volume of benzene was distilled through a fractionating column. A heterogeneous fraction, containing benzene, ethanol, and water, was distilled overhead in the range of 60 to 65° C., and on being tested with 2,4-dinitrophenylhydrazine was found to be substantially free from carbonyl compounds.

Example III

The attached flow sheet illustrates a continuous process for carrying out my invention, employing three fractionating columns equipped with reboilers. A narrow-boiling fraction of ketone-contaminated aqueous n-propyl alcohol, boiling between 87 and 88° C., is mixed with heptane and water and introduced through heater 10 into fractionating column 11 at intermediate point. A ternary azeotrope of n-propyl alcohol, water, and heptane having the following approximate composition distills overhead at 74° C. at atmospheric pressure:

| | |
|---|---|
| Heptane | 68.6% by weight |
| n-Propyl alcohol | 19.8% by weight |
| Water | 11.6% by weight |
| Ketones | none |
| Ratio (in distillate) of organic to aqueous phase: | 5.31% by volume |

The overhead stream is condensed in condenser 12, from which it flows to separator 13 and forms two layers. The upper layer, comprising principally heptane and n-propyl alcohol with a trace of water, is refluxed by way of line 14 to the top of fractionator 11. The bottom layer in separator 13 consists of n-propyl alcohol, water, and a trace of heptane, and is substantially free from ketones. This layer is introduced through heater 15 into fractionating column 16 at an intermediate point, and the traces of heptane distill overhead as a ternary azeotrope with water and n-propyl alcohol. This azeotrope is condensed in cooler 17 and led into separator 18. From separator 18, the heptane (upper) layer is refluxed to the top of fractionator 11 by way of line 14, and the aqueous (lower) layer is refluxed to the top of fractionator 16. A heptane-free solution of n-propyl alcohol and water is withdrawn from the bottom of fractionator 16 and is fed by pump 19 through heater 20 into fractionator 21 at an intermediate point. A wet n-propyl alcohol fraction, substantially free from ketones and heptane, is distilled overhead from fractionator 21 through cooler 22 into reflux bottle 23, from which a portion is refluxed to the fractionator through valve 24, and the remainder is taken off through valve 25. The stripped water stream from the bottom of fractionator 21 is removed through line 26 and discarded or returned to process.

The bottoms from fractionator 11, comprising ketones, heptane, and water, may be subjected to further processing to recover the various components.

While the above examples illustrate the preferred forms of my invention, it will be understood that departures may be made therefrom within the scope of the specification and claims. In particular, it is to be understood that my process is applicable to the purification of ethanol and n-propyl alcohol solutions contaminated with methyl propyl ketone, from whatever source derived. In general, it may be said that any modifications or equivalents that would ordinarily occur to those skilled in the art are to be considered as lying within the scope of my invention.

In accordance with the foregoing specification, I claim as my invention:

1. A process for separating ethanol from a mixture consisting essentially of ethanol and methyl propyl ketone which comprises fractionally distilling said mixture in the presence of water and a hydrocarbon selected from the group consisting of $C_6$ and $C_7$ hydrocarbons and $C_8$ aliphatic hydrocarbons, and withdrawing overhead a ternary azeotrope of ethanol, water and hydrocarbon.

2. The process of claim 1 wherein said hydrocarbon liquid comprises primarily benzene.

3. The process of claim 1 wherein said hydrocarbon liquid comprises primarily $C_7$ hydrocarbons.

4. A process for separating n-propyl alcohol from a mixture consisting essentially of n-propyl alcohol and methyl propyl ketone which comprises fractionally distilling said mixture in the presence of water and a hydrocarbon selected from the group consisting of $C_6$ and $C_7$ hydrocarbons and $C_8$ aliphatic hydrocarbons, and withdrawing overhead a ternary azeotrope of said hydrocarbon, water and n-propyl alcohol.

5. The process of claim 4 wherein said hydrocarbon liquid comprises primarily benzene.

6. The process of claim 4 wherein said hydrocarbon liquid comprises primarily $C_7$ hydrocarbons.

7. The process of claim 4 wherein said hydrocarbon comprises primarily heptane.

8. In a process for separating a purified alcohol from a mixture consisting essentially of methyl propyl ketone and an alcohol selected from the group consisting of ethanol and n-propyl alcohol, the steps which comprise fractionally distilling said mixture in the presence of water and a hydrocarbon selected from the group consisting of $C_6$ and $C_7$ hydrocarbons and $C_8$ aliphatic hydrocarbons, and separating overhead a ternary azeotrope of said alcohol, water and hydrocarbon.

9. In a process for the separation of a lower aliphatic alcohol from an aqueous mixture, the organic components of which consist essentially of methyl propyl ketone and a lower aliphatic alcohol selected from the group consisting of ethanol and 1-propanol, the steps which comprise adding a hydrocarbon selected from the group consisting of $C_6$ and $C_7$ hydrocarbons and $C_8$ aliphatic hydrocarbons to said mixture and thereafter subjecting the latter to distillation whereby said alcohol is removed from said mixture in the form of a ternary azeotrope with said hydrocarbon and water and continuing said distillation until the residue in the still which consists essentially of anhydrous methyl propyl ketone is substantially free from said alcohol.

VESTA F. MICHAEL.

REFERENCES CITED

The following references are of record in the file of this patent:

UNITED STATES PATENTS

| Number | Name | Date |
| --- | --- | --- |
| 2,085,546 | Roelfsema | June 29, 1937 |
| 2,324,255 | Britton | July 13, 1943 |
| 2,351,527 | Lembecke | June 13, 1944 |
| 2,386,058 | Patterson | Oct. 2, 1945 |
| 2,402,077 | Patterson | June 11, 1946 |
| 2,487,124 | Gathman | Nov. 8, 1949 |
| 2,528,761 | Lake | Nov. 7, 1950 |

FOREIGN PATENTS

| Number | Country | Date |
| --- | --- | --- |
| 286,425 | Germany | Aug. 10, 1915 |